United States Patent
Wang et al.

(10) Patent No.: US 11,402,664 B2
(45) Date of Patent: Aug. 2, 2022

(54) GLASSES

(71) Applicants: BEIJING BOE DISPLAY TECHNOLOGY CO., LTD., Beijing (CN); BOE TECHNOLOGY GROUP CO., LTD., Beijing (CN)

(72) Inventors: Qi Wang, Beijing (CN); Tingting Wang, Beijing (CN)

(73) Assignees: BEIJING BOE DISPLAY TECHNOLOGY CO., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 677 days.

(21) Appl. No.: 16/305,549

(22) PCT Filed: Apr. 23, 2018

(86) PCT No.: PCT/CN2018/084126
§ 371 (c)(1),
(2) Date: Nov. 29, 2018

(87) PCT Pub. No.: WO2018/214688
PCT Pub. Date: Nov. 29, 2018

(65) Prior Publication Data
US 2021/0223573 A1 Jul. 22, 2021

(30) Foreign Application Priority Data
May 23, 2017 (CN) .......................... 201710372255.4

(51) Int. Cl.
*G02C 7/08* (2006.01)
*G02B 26/00* (2006.01)
*G02C 11/00* (2006.01)

(52) U.S. Cl.
CPC ........... *G02C 7/085* (2013.01); *G02B 26/005* (2013.01); *G02C 11/10* (2013.01)

(58) Field of Classification Search
CPC .......... G02C 7/085; G02C 11/10; G02C 7/08; G02B 26/005; G02B 26/004; G02B 3/14; G02B 7/008; G02B 7/028; G02B 7/08
See application file for complete search history.

(56) References Cited

U.S. PATENT DOCUMENTS 5,182,585 A * 1/1993 Stoner ...................... G02B 3/14
351/158
6,188,526 B1 2/2001 Sasaya et al.
(Continued)

FOREIGN PATENT DOCUMENTS

CN 1804666 A 7/2006
CN 1823293 A 8/2006
(Continued)

OTHER PUBLICATIONS

PCT International Search Report, Application No. PCT/CN2018/084126, dated Jun. 22, 2018, 6 pages: with English translation.
(Continued)

*Primary Examiner* — Balram T Parbadia
*Assistant Examiner* — Gabriel A Sanz
(74) *Attorney, Agent, or Firm* — Armstrong Teasdale LLP

(57) ABSTRACT

The present disclosure provides a pair of glasses, including spectacle lenses and a sensing device, wherein the spectacle lens includes two layers of lenses which form a cavity, wherein the layer of lens on a wearing side of the spectacle lens is deformable, the cavity is filled with a first liquid and a second liquid, a volume of the first liquid is greater than that of the second liquid, and an electrowetting film is provided oppositely on a middle portion of an inner surface of at least one layer of lens, and wherein the sensing device is configured to measure a distance between the glasses and an object to be observed, wherein in the case where the measured distance is less than a preset spacing, the sensing
(Continued)

device is turned on to apply a voltage to the electrowetting film.

15 Claims, 1 Drawing Sheet

(56) References Cited

U.S. PATENT DOCUMENTS

| | | | | |
|---|---|---|---|---|
| 2007/0153405 A1* | 7/2007 | Kuiper | ............... | G02B 26/005 |
| | | | | 359/846 |
| 2008/0239925 A1* | 10/2008 | Kuiper | ............... | G02B 5/1828 |
| | | | | 369/112.02 |
| 2012/0133891 A1* | 5/2012 | Jiang | ................. | A61B 3/0025 |
| | | | | 351/210 |
| 2019/0011612 A1* | 1/2019 | Mastrangelo | ......... | G06F 3/016 |

FOREIGN PATENT DOCUMENTS

| | | |
|---|---|---|
| CN | 1938608 A | 3/2007 |
| CN | 101793377 A | 8/2010 |
| CN | 106950721 A | 7/2017 |

OTHER PUBLICATIONS

PCT Written Opinion, Application No. PCT/CN2018/084126, dated Jun. 22, 2018, 7 pages.: with English translation of relevant part.
China First Office Action, Application No. 201710372255.4, dated Jul. 12, 2018, 13 pps.: with English translation.

\* cited by examiner

GLASSES

CROSS REFERENCE TO RELATED APPLICATIONS

This patent application is a National Stage Entry of PCT/CN2018/084126 filed on Apr. 23, 2018, which claims the benefit and priority of Chinese Patent Application No. 201710372255.4 filed on May 23, 2017, the disclosures of which are incorporated herein by reference in their entirety as part of the present application.

BACKGROUND

The present disclosure relates to the field of visual technology, and in particular to a pair of glasses.

At present, many people are plagued by vision problems. Myopia patients may gradually develop presbyopia with age. Some of these people may suffer from both myopia and hyperopia. People suffering from myopia and hyperopia need to wear myopia glasses for a distant view and presbyopic glasses for a close view, and hence have to carry two pairs of glasses, which is very inconvenient. Furthermore, changing the glasses from time to time also brings great inconvenience to this part of people, and also increases the fatigue of the eyes.

Therefore, in view of the above deficiencies, there is a need for a pair of glasses that may be freely switched between myopia glasses and hyperopia glasses.

BRIEF DESCRIPTION

The present disclosure provides a pair of glasses, including spectacle lenses and a sensing device.

The spectacle lens includes two layers of lenses which form a cavity, wherein the layer of lens on a wearing side of the spectacle lens is deformable. The cavity is filled with a first liquid and a second liquid. A volume of the first liquid is greater than that of the second liquid. An electrowetting film is provided oppositely on a middle portion of an inner surface of at least one layer of lens.

The sensing device is configured to measure a distance between the glasses and an object to be observed. In the case where the measured distance is less than a preset spacing, the sensing device is turned on to apply a voltage to the electrowetting film such that the first liquid accumulates toward a center of the spectacle lens, the second liquid accumulates toward edges of the spectacle lens, and the spectacle lens is switched to a convex lens; otherwise, the sensing device ends the application of the voltage to the electrowetting film such that the second liquid accumulates toward the center of the spectacle lens, the first liquid accumulates toward the edges of the spectacle lens, and the spectacle lens is switched to a concave lens.

A side of the spectacle lens away from the wearing side may be a transparent rigid lens.

The wearing side of the spectacle lens may be a flexible film supported by an elastic polymer material.

A conductive film may be provided on the inner surface of the at least one layer of lens, and the sensing device may be configured to apply the voltage to the electrowetting film through the conductive film.

A refractive index of the first liquid may be the same as or similar to that of the second liquid.

The first liquid may be an aqueous solution and the second liquid may be an oily liquid.

The first liquid may be a sucrose solution with a mass concentration of 80%.

The oily liquid may be one of glycerin, turpentine, and carbon tetrachloride.

The glasses further may include a lens frame on which the spectacle lenses are mounted, the sensing device being provided on a portion of the lens frame between the two spectacle lenses.

The preset spacing may range from 30 cm to 50 cm.

The electrowetting film may be provided at a middle portion of the inner surface of the two layers of lenses.

The electrowetting film may be made of a polytetrafluoroethylene material.

The sensing device may include an infrared rangefinder or a laser rangefinder.

The conductive film may be located between the electrowetting film and the flexible film.

The electrowetting film may be integrated with the conductive film.

The conductive film may be an ITO conductive metal film.

DETAILED DESCRIPTION

In order to make the above-mentioned purposes, features, and advantages of the present disclosure more apparent and easy to understand, the present disclosure is further described in detail below in conjunction with the drawings and specific embodiments.

Figure 1:
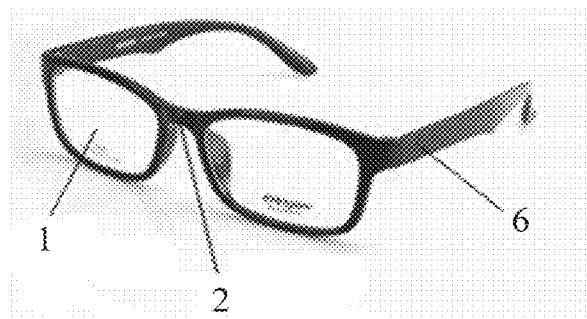
FIG. 1 shows a schematic structural view of a pair of glasses according to an embodiment of the present disclosure.

As shown in FIG. 1, the glasses according to an embodiment of the present disclosure may include spectacle lenses 1 and a sensing device 2.

Figure 2:
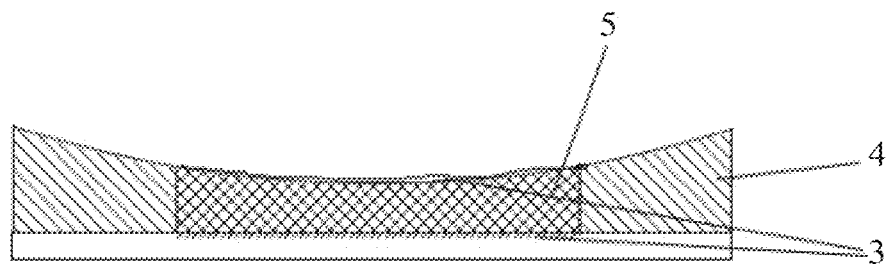
FIG. 2 shows a schematic structural view of a spectacle lens in a myopia mode according to an embodiment of the present disclosure.
Figure 3:
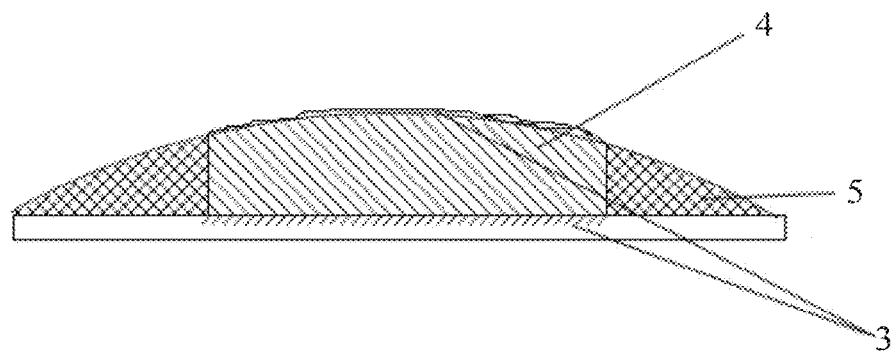
FIG. 3 shows a schematic structural view of a spectacle lens in a hyperopia mode according to an embodiment of the present disclosure.

The spectacle lens 1 includes two layers of lenses which form a cavity. The layer of lens on a wearing side of the spectacle lens is deformable. As used herein, the word "wearing side" of the spectacle lens refers to a side of the spectacle lens close to the human eye in the state that the spectacle lens is wore by a human. As shown in FIG. 2 and FIG. 3, the cavity is filled with a first liquid 4 and a second liquid 5. A volume of the first liquid 4 is greater than that of the second liquid 5. Electrowetting films 3 are provided oppositely on middle portions of two inner surfaces of the spectacle lens 1. The wettability of the electrowetting film 3 may vary depending on whether it is in an electric field. As an example, in the case where it is not in an electric field, the electrowetting film 3 has a wettability for the first liquid greater than that for the second liquid, and thus has affinity with the first liquid; in the case where it is in an electric field, the electrowetting film 3 has a wettability for the second liquid greater than that for the first liquid, and thus has affinity with the second liquid. Therefore, the wettability of the electrowetting film 3, that is, the wettability for the first liquid 4 and the second liquid 5, may be changed by applying a voltage to the electrowetting film 3 or ending the application of the voltage, thereby changing the position of the first liquid 4 and the second liquid 5 within the spectacle lens 1 and thus achieving the switching between the convex lens and the concave lens.

The electrowetting film 3 may be made of a polytetrafluoroethylene material.

In practical operation, the ratio of the volume of the first liquid 4 to the volume of the second liquid 5 may be adjusted accordingly based on the degree of hyperopia or myopia of a patient, which is not limited in the embodiments of the present disclosure.

The sensing device 2 may be configured to measure a distance between the glasses and an object to be observed. The sensing device 2 may be any distance testing device such as an infrared rangefinder, a laser rangefinder, or the like. In the case where the measured distance is less than a preset spacing, the sensing device 2 automatically triggers the application of a voltage to the electrowetting film 3, and at this time, the wettability of the electrowetting film 3 also changes such that the wettability of the electrowetting film 3 for the first liquid 4 is greater than that for the second liquid 5. As a result, the first liquid of a larger volume accumulates toward a center of the spectacle lens 1, and the second liquid of a smaller volume accumulates toward edges of the spectacle lens 1, as shown in FIG. 3. Under this situation, the spectacle lens 1 is switched to a convex lens from a concave lens which functions when the glasses are powered off, that is, the glasses are switched from myopia glasses to hyperopia glasses. The preset spacing may be stored, for example, in the sensing device 2.

In the case where the measured distance is greater than the preset spacing, the sensing device 2 automatically ends the application of a voltage to the electrowetting film 3, and at this time, the wettability of the electrowetting film 3 also changes such that the wettability of the electrowetting film 3 for the second liquid 5 is greater than that for the first liquid 4. As a result, the second liquid 5 of a smaller volume accumulates toward the center of the spectacle lens 1, and the first liquid 4 of a larger volume accumulates toward the edges of the spectacle lens 1, as shown in FIG. 2. Under this situation, the spectacle lens 1 is switched to a concave lens from a convex lens which functions when the glasses are powered on, that is, the glasses are switched from hyperopia glasses to myopia glasses.

A side of the spectacle lens 1 away from the wearing side may be a transparent rigid lens, which may support the liquid structure within the spectacle lens 1 and prevent the spectacle lens 1 from being deformed by other external factors and then further affecting the correction accuracy of the glasses.

It is to be understood that the transparent rigid lens in the embodiments of the present disclosure may be selected from materials such as glass, resin, etc., but what specific material to be used is not limited in the embodiments of the present disclosure.

The wearing side of the spectacle lens 1 may be a flexible film supported by an elastic polymer material. The elastic polymer material may be used to support the electrowetting film 3, maintain uniform continuity of curvature of the electrowetting film 3, and fix the first liquid 4 and the second liquid 5 to prevent deviation of correction accuracy due to gravity.

It is to be understood that the elastic polymer material in the embodiments of the present disclosure may be a fiber, a rubber, or the like, but what specific polymer material to be used is not limited in the embodiments of the present disclosure.

Accordingly, a conductive film is provided on both inner surfaces of the spectacle lens 1 to control, by the sensing device 2, the application of a voltage to the electrowetting film 3 through the conductive film. The electrowetting film 3 may be provided, for example, on the conductive film, that is, the conductive film is located between the electrowetting film 3 and the flexible film or the transparent rigid lens material. Alternatively, the electrowetting film 3 may be integrated with the conductive film. As an example, a conductive film or a conductive wire may be provided within the electrowetting film 3.

In an embodiment of the present disclosure, the conductive film may be an ITO conductive metal film layer or the like, but the specific material used for the conductive film is not limited in the embodiments of the present disclosure.

It may also be possible to provide the electrowetting film 3 only on the middle portion of the inner surface of one layer of the lens of the spectacle lens 1, and accordingly, a conductive film is provided only on the inner surface of this layer of lens. As an example, the electrowetting film 3 and the conductive film may be provided only in the middle portion of the inner surface of the flexible film. As used herein, the word "inner surface" of one layer of lens refers to a surface of the one layer of lens forming the cavity (i.e., a surface of the one layer of lens toward the first liquid and the second liquid).

The conductive film may be powered by a power source such as a button battery, and the sensing device 2 may be located on the power supply circuit and server as a power switch. That is, in the case where the distance between the glasses and the object to be observed measured by the sensing device 2 is less than a preset spacing, the power source is automatically triggered to supply power to the electrowetting film 3; and in the case where the measured distance is greater than the preset spacing, the power source is automatically disconnected and stops supplying power to the electrowetting film 3. The button battery may be provided, for example, at an appropriate position of the lens frame that does not affect the appearance and use thereof, such as inside a temple of the lens frame 6, and may be electrically connected to the conductive film and the sensing device 2 through wires provided within the lens frame 6.

A refractive index of the first liquid 4 may be the same as that of the second liquid 5.

In an embodiment of the present disclosure, in order to improve the appearance of glasses and ensure transmittance, the refractive indices of the spectacle lenses 1, the first liquid 4, and the second liquid 5 may be the same or similar.

It may be understood that, in practical applications, if the refractive indices of the selected spectacle lens, the first liquid and the second liquid are not completely the same, three kinds of materials having similar refractive indices may be selected to prepare them, which are not to be limited in the embodiments of the present disclosure. As used herein, the expression "similar" means a refractive difference between the first liquid and the second liquid, between the first liquid and the spectacle lens, and/or between the second liquid and the spectacle lens is no more than 10%.

In another embodiment of the present disclosure, the first liquid 4 may be an aqueous solution and the second liquid 5 may be an oily liquid.

In the case where a glass or resin with a refractive index of 1.49 is used as the rigid transparent spectacle lens of the spectacle lens 1, since the refractive index of pure water is 1.33, a sucrose solution with a mass concentration of 80% may be selected as the aqueous solution, and since the refractive index of the sucrose solution having a mass concentration of 80% is 1.49, it thus can be ensured that the refractive index of the first liquid 4 is the same as the refractive index of the spectacle lens 1. There are many oily liquids with a refractive index of about 1.49, such as, glycerin, turpentine, carbon tetrachloride, etc., and one of them may be selected as the second liquid 5, which is not limited in the embodiments of the present disclosure.

As shown in FIG. 1, the glasses in embodiments of the present disclosure may further include a lens frame 6 on which the spectacle lenses 1 are mounted, and the sensing device 2 may be provided on a portion of the lens frame 6 between the two spectacle lenses 1.

It may be understood that the sensing device 2 may be provided at a middle position of the lens frame 6 between the two spectacle lenses 1 so as to ensure that the measured distance between the glasses and the object to be observed is more precise.

The preset spacing may be 40 cm.

In an embodiment of the present disclosure, the preset spacing may be set to be 40 cm, since 40 cm is more in line with the habit of most people observing close objects, such as reading a book, watching a computer, and the like. Therefore, whether or not to apply a voltage to the electrowetting film 3 may be determined by setting the preset spacing to be 40 cm so as to achieve switching between the myopia glasses and the hyperopia glasses.

Of course, those skilled in the art may also set the preset spacing according to actual needs, such as 30 cm, 50 cm, etc., which is not limited in the embodiments of the present disclosure.

The glasses provided by embodiments of the present disclosure measure the distance between the glasses and the object to be observed by using the sensing device. In the case where the measured distance is less than the preset spacing, the sensing device is turned on to apply a voltage to the electrowetting film such that the first liquid accumulates toward the center of the spectacle lens, the second liquid accumulates toward the edges of the spectacle lens, and thus the spectacle lens is switched to a convex lens; otherwise, the sensing device ends the application of the voltage to the electrowetting film such that the second liquid accumulates toward the center of the spectacle lens, the first liquid accumulates toward the edges of the spectacle lens, and thus the spectacle lens is switched to a concave lens, thereby realizing the switching between the convex lens and the concave lens, i.e., the switching between the hyperopia glasses and the myopia glasses. In this way, for people with both myopia and hyperopia, there is no need to carry two pair of glasses with them, and there is no need to change glasses from time to time, which brings great convenience to people who suffer from both myopia and hyperopia, and may also reduce eye fatigue.

For the foregoing embodiments, for the sake of brevity, they are all described as a series of combinations of actions, but those skilled in the art should understand that the present disclosure is not limited by the described order of actions, because some steps may be performed in other orders or simultaneously according to the present disclosure. Furthermore, those skilled in the art should also understand that the embodiments described in the description are all example embodiments, and the actions and modules involved are not necessarily required by the present disclosure.

The various embodiments in the present description are described in a progressive manner, and each embodiment focuses on differences from other embodiments, and the various embodiments may refer to each other for the same or similar parts.

Last, it should also be noted that in this context, relational terms such as first and second are used merely to distinguish one entity or operation from another entity or operation, and do not necessarily suggest or imply there is any such actual relationship or order between these entities or operations. Furthermore, the terms "comprise," "include," or any other variant thereof are intended to cover non-exclusive inclusions, so that a process, method, product, or device that includes a series of elements includes not only those elements, but also other elements not explicitly listed, or includes elements that are inherent to such a process, method, product, or device. In the case where no more restrictions are made, an element that is defined by the phrase "including a . . . " does not exclude the presence of additional elements in the process, method, product, or device that includes the element.

The glasses provided by the present disclosure have been described in detail above, and the principles and embodiments of the present disclosure are described herein by using specific examples. The description of the above embodiments is only for helping to understand the method of the present disclosure and the core idea thereof. Also, those of ordinary skill in the art may also make modifications to the specific embodiments and scope of application according to the ideas of the present disclosure. In summary, the contents of the description should not be construed as a limitation of the present disclosure.

What is claimed is:

1. A pair of glasses comprising spectacle lenses and a sensing device,
   wherein a spectacle lens comprises two layers of lenses which form a cavity, a layer of lens on a wearing side of the spectacle lens is deformable, the cavity is filled with a first liquid and a second liquid, a volume of the first liquid is greater than that of the second liquid, and an electrowetting film is provided on a middle portion of an inner surface of at least one layer of lens, wherein a refractive index of the first liquid is the same as that of the second liquid, and
   wherein the sensing device is configured to measure a distance between the glasses and an object to be observed, wherein in a case where the measured distance is less than a preset spacing, the sensing device is turned on to apply a voltage to the electrowetting film such that the first liquid accumulates toward a center of the spectacle lens and the second liquid accumulates toward edges of the spectacle lens to an extent that the second liquid is divided into two parts by the first liquid and the first liquid is located between the two parts of the second liquid, and the spectacle lens is switched to a convex lens; otherwise, the sensing device ends the application of the voltage to the electrowetting film such that the second liquid accumulates toward the center of the spectacle lens and the first liquid accumulates toward the edges of the spectacle lens to an extent that the first liquid is divided into two parts by the second liquid and the second liquid is located between the two parts of the first liquid, and the spectacle lens is switched to a concave lens.

2. The glasses according to claim 1, wherein a side of the spectacle lens away from the wearing side is a transparent rigid lens.

3. The glasses according to claim 1, wherein the wearing side of the spectacle lens is a flexible film supported by an elastic polymer material.

4. The glasses according to claim 3, wherein a conductive film is provided on the inner surface of the at least one layer of lens, and wherein the sensing device is configured to apply the voltage to the electrowetting film through the conductive film.

5. The glasses according to claim 4, wherein the conductive film is located between the electrowetting film and the flexible film.

6. The glasses according to claim 4, wherein the electrowetting film is integrated with the conductive film.

7. The glasses according to claim 4, wherein the conductive film is an ITO conductive metal film.

8. The glasses according to claim 1, wherein the first liquid is an aqueous solution and the second liquid is an oily liquid.

9. The glasses according to claim 8, wherein the first liquid is a sucrose solution with a mass concentration of 80%.

10. The glasses according to claim 8, wherein the oily liquid is one of glycerin, turpentine, and carbon tetrachloride.

11. The glasses according to claim 1, wherein the glasses further comprise a lens frame on which the spectacle lenses are mounted, the sensing device provided on a portion of the lens frame between the two spectacle lenses.

12. The glasses according to claim 1, wherein the preset spacing ranges from 30 cm to 50 cm.

13. The glasses according to claim 1, wherein the electrowetting film is provided at the middle portion of the inner surface of the two layers of lenses.

14. The glasses according to claim 1, wherein the electrowetting film is made of a polytetrafluoroethylene material.

15. The glasses according to claim 1, wherein the sensing device comprises an infrared rangefinder or a laser rangefinder.

* * * * *

UNITED STATES PATENT AND TRADEMARK OFFICE
CERTIFICATE OF CORRECTION

Page 1 of 1

PATENT NO. : 11,402,664 B2
APPLICATION NO. : 16/305549
DATED : August 2, 2022
INVENTOR(S) : Qi Wang et al.

It is certified that error appears in the above-identified patent and that said Letters Patent is hereby corrected as shown below:

On the Title Page

Item (73), in Assignees, delete "BEIJING BOE DISPLAY TECHNOLOGY CO., Beijing (CN); BOE TECHNOLOGY GROUP CO., LTD., Beijing (CN)" and insert therefor -- BEIJING BOE DISPLAY TECHNOLOGY CO., LTD., Beijing (CN); BOE TECHNOLOGY GROUP CO., LTD., Beijing (CN) --.

Signed and Sealed this
Eighth Day of August, 2023

Katherine Kelly Vidal
*Director of the United States Patent and Trademark Office*